United States Patent Office 2,812,187
Patented Nov. 5, 1957

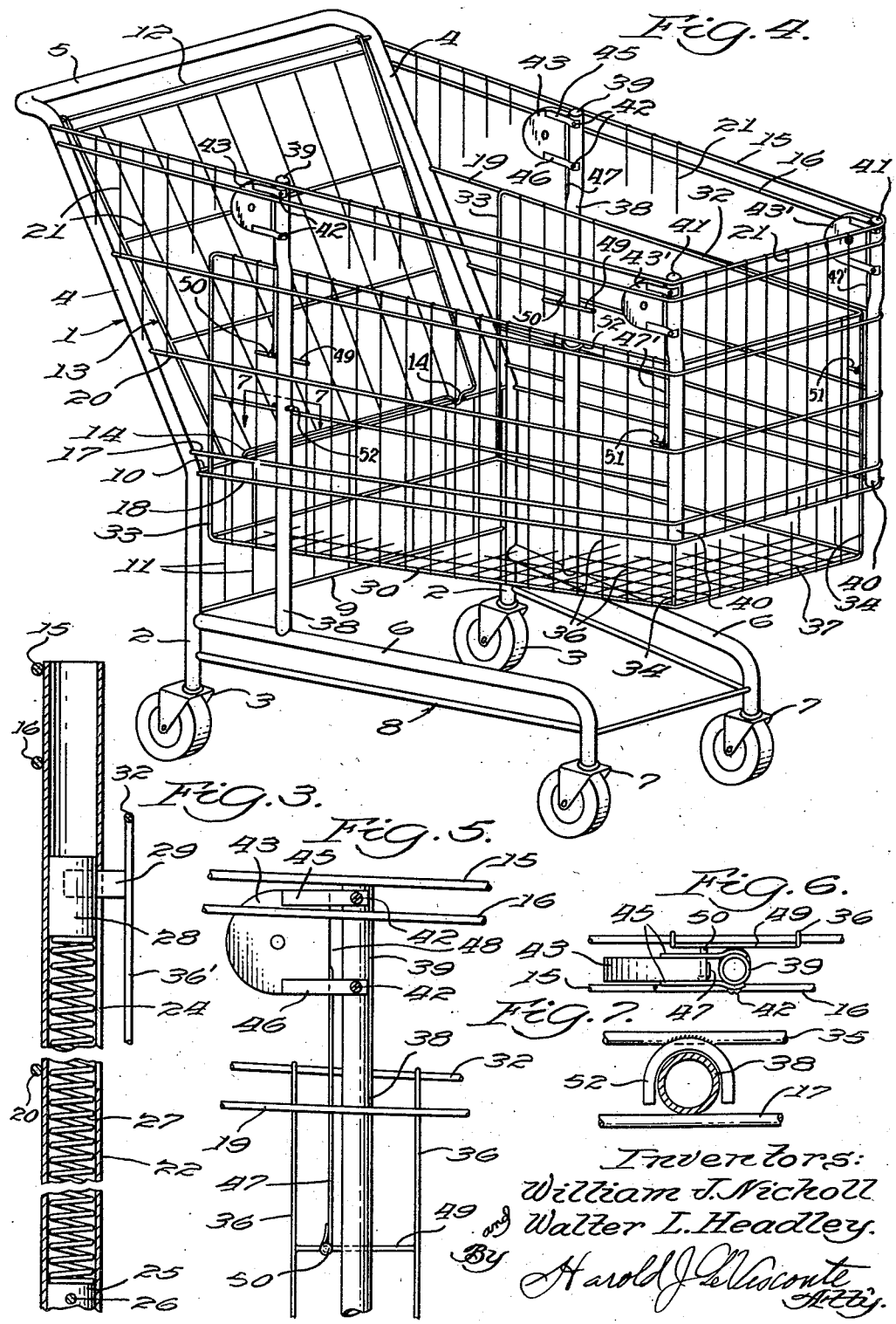

2,812,187

NESTABLE SHOPPING CART WITH MOVABLE BOTTOM

William J. Nicholl, La Crescenta, and Walter L. Headley, Glendale, Calif.

Application March 19, 1956, Serial No. 572,442

7 Claims. (Cl. 280—33.99)

This invention relates to shopping carts of the so-called "nesting" type and more particularly to an improvement therein by which the basket component may be expanded for added capacity without interfering with the ability of the carts to be nested together when not in use.

In recent years the use of shopping carts in large food markets has become practically universal and more recently there has been a demand that the capacity of the baskets be increased. To date this demand has been met by increasing the size of the basket and consequently increasing the floor space occupied by a cart, but this in turn has reached a point at which market operators object to the size and the larger carts are unpopular with customers as well with the result that they go to markets having carts which they like to use.

With these considerations in mind, it is an object of the present invention to provide a shopping cart having a basket of normally laterally disposed frusto-pyramidal form and having a swinging gate at the large end thereof to accommodate nesting of carts for storage in the usual manner and in which the basket component includes a bottom section yieldingly mounted to lower in response to the weight of contents of the basket with resultant increase in the capacity of the basket.

Another object of the invention is to provide a shopping cart of the foregoing type in which the basket bottom is yieldingly supported by a series of compression springs positioned in spaced relation about the periphery of the basket.

A further object of the invention is to provide a shopping cart of the above type in which the basket bottom is yieldingly supported by a series of spring biased reels each having a flexible member attached to the basket bottom and being effective to yieldingly let out the said flexible members in response to weight in the basket with resultant lowering of the basket bottom to increase the capacity of the basket.

With the foregoing objects in view, together with such additional objects and advantages as may subsequently appear, the invention resides in the parts, and in the construction, combination and arrangement of parts described, by way of example in the following specification of certain presently preferred forms of the invention; reference being had to the accompanying drawings which form a part of said specification and in which drawings:

Fig. 1 is a perspective view of a shopping cart embodying one form of the invention in which the bottom component of the basket is yieldingly mounted on a series of compression springs; the basket bottom being shown in partially depressed position and certain portions of the vertical wires forming the sides of the basket structure being omitted for the sake of clearness of illustration, Fig. 2 is a fragmentary longitudinal sectional view taken on the line 2—2 of Fig. 1 with the basket bottom elevated to normal position and with the action of the swinging end gate and the extent to which the bottom component can be lowered indicated by broken lines, Fig. 3 is an enlarged, fragmentary, sectional view taken on the line 3—3 of Fig. 1 showing details of the yielding support for the basket bottom, Fig. 4 is a perspective view of a second embodiment of the invention in which the basket bottom is yieldingly supported by a series of spring biased reel devices having flexible members attached to the basket bottom component; the basket bottom being shown in partially lowered position, Fig. 5 is an enlarged, fragmentary side elevation of Fig. 1 showing representative details of the mounting of one of the reel devices and the connection of the flexible member thereof to the basket bottom component, Fig. 6 is a top plan view of the portion shown in Fig. 5, and Fig. 7 is an enlarged, transverse, sectional view taken on the line 7—7 of Fig. 4 showing a detail of a guiding means.

Referring to the form of the invention shown in Figs. 1, 2 and 3, the cart comprises a base framework preferably formed from tubing and including a back section 1 of modified inverted U-shape in configuration comprising vertical leg portions 2, 2 each carrying a caster 3 at the lower end thereof, and thence extending diagonally upwardly in back portions 4, 4, thence being bent into substantially horizontal position and thence forming a horizontal handle portion 5. Fixed to each leg portion 2 slightly above the lower end thereof are horizontal, forwardly extending frame members 6, 6 which from rear to front are inclined slightly toward each other and at their distal ends are bent downwardly and carry casters 7, 7; said casters preferably being freely movable about a vertical axis for convenience in manipulating the cart. A reinforcing rod 8 of modified U-shape has the ends thereof attached to the leg portions 2, 2 thence extends parallel to the members 6, 6 and is secured to the turned down end portions of said members.

A rod 10 extends horizontally between the upper ends of the leg portions 2, 2 and a second rod 9 extends parallel to the rod 10 between the leg members at about the level at which the frame members 6, 6 are attached to the leg portions. The rods 9 and 10 are connected by a series of spaced vertical wires 11 forming a back panel portion. A third rod 12 extends between the upper ends of the back portions 4, 4 and swingably mounted on the rod 12 is a gate 13 which substantially fills the area bounded by the portions 4, 4 and the rods 10 and 12; the lower edge of the gate having outwardly projecting portions 14, 14 which engage the forward side of the rod 10 and prevent the gate from swinging rearwardly of the rod 10. The ends of the rods 9, 10 and 12 are welded or otherwise attached to the main frame members and serve as reinforcements therefor in addition to forming the back panel and supporting the gate 13.

The basket is carried by and projects forwardly from the portions 4, 4 of the main frame and is spaced above the members 6, 6. The top of the basket projects horizontally from the level of the rod 12 and the sides thereof converge slightly toward each other toward the forward end thereof to permit nesting with the basket of another cart when pushed through from the rear with the gate 13 swinging upwardly to permit entry thereof. The upper portion of the basket comprises six rods bent into modified U-shape to conform to the shape of the basket as viewed in plan and having their ends attached to the members 4, 4; the said six rods comprising rods 15 and 16 closely spaced at the top of the basket, closely spaced rods 17 and 18 disposed at the bottom edge of the stationary portion of the basket, and equally spaced rods 19 and 20 disposed between the rods at the upper and lower edges. Vertical wires 21 extending between the rods 15 and 18 and welded to all of the rods 15, 16, 17, 18, 19 and 20 at all points of intersection therewith complete the formation of the stationary portion of the basket; the back of said stationary or fixed portion being formed by the gate 13. Also the distance between the top pair of rods 15 and 16 and the bottom pair 17 and 18 gradually decreases toward the front of the basket thus combining with the lateral convergence of the sides to give the basket a frusto-pyramidal configuration.

The frame members 6, 6 adjacent the rear ends thereof each carry a vertical tubular member 22 which extends along the inner faces of the rods 15—20 and terminates at the level of the rods 15 and which is welded or otherwise secured to said rods at all points of intersection therewith. The forward end of the stationary portion of the basket carries a pair of vertical tubular members 23 welded or otherwise secured to the rods 15—20 at the inner faces of the bends therein forming the corners at the forward end of the basket. The tubular members 22, 22 and 23, 23 are each provided with a vertically extending slot 24 defining the path of movement of the upper edge of the movable bottom component of the basket to be presently described; the slots in the members 22, 22 being disposed opposite each other transversely of the basket and the slots in the members 23, 23 being disposed at the side of said members facing the rear of the cart. The bottom end of each of the members 23, 23 is closed by a plug 25 secured therein by a rivet 26 and the members 22, 22 are each supplied with a corresponding plug disposed at the same level therein as the plugs in the members 23, 23. Mounted in each of the members 22, 22 and 23, 23 is a compression spring 27 at the upper end of which is a freely sliding plug 28 having an arm 29 projecting through the slot 25; the length of the springs being such as to be under initial load when opposed by the plug with upward movement of the plug limited by engagement of the arm 29 with the upper end of the slot 24.

The movable component of the basket, as viewed in plan, is slightly smaller than and conforms in shape to the fixed portion of the basket above described and moves within the area bounded by the rod 10 and the rods 17 and 18 and comprises a bottom, a front end and two sides; the rear end being open to permit movement of the gate 13 and the entry of the front end of another cart incident to being nested therewith. The frame of the moving component of the basket comprises a bottom loop 30 formed from heavy wire or steel rod, a top and rear end frame member also formed from similar material bent to form a front end portion 31, side members 32, 32 and vertically disposed rear end members 33, 33. The front end portion of the bottom loop 30 and the top frame member front end portion are connected by corner members 34, 34. Additionally, the frame comprises a member 35 disposed at the mid-distance between the bottom loop and the top of the moving basket component co-extensive with the sides and front end of the component. The sides are formed by spaced vertical wires 36 and the bottom 37 is formed by a network of longitudinal and transversely extending wires and all of said wires and all of said frame components are interconnected by welding at all points of juncture or intersection.

Additionally, at each side one of the wires 36′ disposed opposite the tubular member 22 is formed of heavier material than the other vertical wires 36 and welded to the protruding arm 29 with the moving basket component in a position in which the bottom thereof is substantially in the plane of the rod 18 of the stationary component and the lugs 29 protruding from the members 23, 23 are likewise welded to the members 34, 34 whereby the moving component of the basket is yieldingly supported by the four springs 27 within the tubular members 22, 22 and 23, 23. In use, as the basket is loaded, the moving component compresses the springs incident to the weight of the load with resultant increase in the capacity of the basket; the extent of such movement being indicated by dotted lines in Fig. 2. As the purchases are removed by the checker, the moving component gradually moves up and maintains the top of the load within normal reach of the checker. When not in use, the moving component is telescoped within the stationary component and the cart may be nested with other carts for storage in the usual manner.

Referring next to the second form of the invention all parts which are identical have been given the same numbers as in Figs. 1, 2 and 3 and description thereof need not be repeated. In this form of the invention the compression springs for supporting the movable component of the basket are replaced by spring biased reel devices similar to the spring reel devices used to support double hung windows. Referring to Figs. 4 through 7, the members 22, 22 are replaced by tubular members 38, 38 which extend upwardly from the members 6, 6 and terminate in an outwardly offset upper end 39, 39. Also the tubular corner members 23, 23 are replaced by tubular members 40, 40 which likewise terminate in outwardly offset upper ends 41, 41. Attached by screws 42, 42 to each upper end of the members 38, 38 is a spring biased reel device 43 having forwardly projecting pairs of upper and lower ear portions 45 and 46 which straddle the member 38 and through which the screws 42, 42 extend to secure the device. The device houses a torsion spring means and a reel carrying a flexible member 47, the end of which protrudes through an opening in the face 48 of the device and is parallel to and slightly spaced from the member 38. The flexible member extends downwardly therefrom and is attached to a cross member 49 extending between adjacent vertical wires 36 of the movable component of the basket by a cross pin 50. The offset upper ends of the corner members 40, 40 are likewise provided with similar spring biased reel devices 43′ having the flexible members 47′ thereof similarly connected to cross members 51 extending between the corner member 34 and an adjacent vertical wire 36. Additionally, the intermediate reinforcing frame member 35 of the movable component of the basket carries a pair of U-shaped guide members 52 which slidingly engage the members 39, 39 and assist in the level descent of the basket bottom. The said spring biased reel devices are readily available on the open market and therefore are not described as to interior constructions; there being several makes which are satisfactory for the purpose. Those for the smaller sizes of windows are deemed satisfactory without change except for the addition of the mounting ear portions described. The mode of operation is the same as previously recited except that the spring reel devices do not have the deflection in response to load that is characteristic of the compression springs and instead, upon being subjected to sufficient load, allow the basket to descend to its full extent with little increase in load. The response to reduction of load is of the same character and when the load is reduced sufficiently, the spring reel devices raise the basket component supported thereby to its upper limit of movement. When thus raised, the cart can be nested in the same manner as in the first described form.

While the foregoing specification has disclosed presently preferred embodiments of the invention, it is not to be inferred that the invention is limited thereby to the embodiments thus disclosed by way of example, and it will be understood that the invention embraces all such modifications and changes in the parts, and in the construction, combination and arrangement of parts as shall come within the purview of the appended claims.

We claim:

1. In a nesting type shopping cart, the combination of a frame including a substantially horizontal bottom portion laterally converging from rear to front and affording entry space for the corresponding portion of another cart to be nested therewith and a substantially vertical basket support at the rear end of said horizontal portion and including a horizontally disposed handle, a basket component having the rear end thereof mounted on said vertical portion and projecting forwardly therefrom in converging, frusto-pyramidal configuration and including fixed side and front end panels, a forwardly and upwardly swinging gate forming the rear end of said fixed component and affording entry by the front end of another basket of a cart to be nested therewith, a downwardly yieldable bottom component mounted on said basket and comprising a bottom portion, a front wall portion, and side wall portions, spring means carried by said fixed component of said basket at spaced points effective normally to maintain said bottom component raised substantially to the plane of the lower edge of said fixed component and yieldably responsive to load imposed on said bottom component to allow said bottom component to descend with resultant increase in the capacity of said basket, and a panel carried by said vertical portion of said frame serving to close the rear end of said bottom component as it is lowered by load imposed thereon.

2. A shopping cart as claimed in claim 1 in which said bottom component is supported by a series of compression springs carried by said fixed component of said basket.

3. A shopping cart as claimed in claim 1 in which said bottom component of said basket is supported by a plurality of flexible members each of which is attached to a spring biased reel device carried by said fixed component and tending constantly to lift said basket to the upper extent of its movement.

4. A shopping cart as claimed in claim 1 in which said cart includes a plurality of vertically disposed tubular members each having a slot in the side thereof adjacent said bottom component and each of said tubular members housing a compression spring and having a fixed abutment for the lower end of the spring housed therein, and a plug member freely slidingly engaging the interior of the tubular member and having an arm extending through the slot in the tubular member and secured to a member forming the side wall of said bottom component; the said engagement between said arms and their respective slots serving additionally as guides for the upward and downward movement of said bottom component.

5. A shopping cart as claimed in claim 2 in which said yielding means for supporting said basket includes a pair of vertically disposed tubular members rising from the rear portion of the bottom portion of said frame within the sides of the fixed component of the basket and a second pair of vertically disposed tubular members disposed one at each front corner of said fixed component; each of said tubular members housing a compression spring supported on an abutment within the tubular member and having a freely sliding plug engaging the upper end of said spring, said tubular member having a vertical slot at the side thereof adjacent the bottom component of the basket and said plug having an arm extending through said slot and attached to said bottom component of said basket; said first named pair of tubular members being attached to said fixed component of said basket and serving as additional supporting means therefor.

6. A shopping cart as claimed in claim 3 in which said means for yieldingly supporting said bottom component of said basket includes a pair of vertical members rising from the horizontal portion of said frame adjacent the rear end thereof and disposed within and adjacent to the sides of the fixed component of the basket; said vertical members being fixed to said sides of said basket component and serving as additional support therefor, a second pair of vertical rigid members forming the front corners of said fixed component; each of said vertical members at the upper end thereof carrying a spring biased reel device including a flexible member extending from the reel thereof to said bottom component of said basket; the combined bias of said reel devices being sufficient to retain said bottom component, in the absence of load thereon, at the upper extent of its movement and upon load being imposed thereon to allow said bottom component to descend with resultant increase in the capacity of said basket.

7. In a shopping cart of the nesting type, a caster mounted frame having an open rear end and a forwardly converging front end and said frame supporting a forwardly converging basket of frusto-pyramidal configuration having a swinging rear end gate permitting nesting entry by the basket of another cart; said basket including the provision of a downwardly yieldably supported bottom component effective to increase the capacity of said basket as load is imposed thereon incident to filling the basket with articles of merchandise; said bottom component being open at the rear end thereof to allow nesting of carts, and means disposed below said gate and closely in rear of the path of travel of said bottom component effective to form a closure for said open end when said bottom component is moved downwardly by load thereon said yieldable support for said bottom component, in the absence of load thereon, being constantly effective to return said bottom component to the uppermost portion of travel thereof with resumption of the capacity for being nested exteriorly or interiorly with the similarly formed basket of another cart.

References Cited in the file of this patent

UNITED STATES PATENTS

| | | |
|---|---|---|
| 428,780 | McClinchie | May 27, 1890 |
| 1,739,431 | Willauer | Dec. 10, 1929 |
| 2,468,115 | Saul | Apr. 26, 1949 |
| 2,583,513 | Maslow | Jan. 22, 1952 |
| 2,639,035 | Pearlstein | May 19, 1953 |
| 2,639,161 | Goldman | May 19, 1953 |

FOREIGN PATENTS

| | | |
|---|---|---|
| 3,008 | Great Britain | 1889 |